United States Patent
Fritzsche et al.

(10) Patent No.: US 9,459,978 B2
(45) Date of Patent: Oct. 4, 2016

(54) AUTOMATED TEST PLATFORM UTILIZING SEGMENTED DATA SEQUENCERS TO PROVIDE TIME CONTROLLED TEST SEQUENCES TO DEVICE UNDER TEST

(71) Applicant: LTX-Credence Corporation, Norwood, MA (US)

(72) Inventors: William A. Fritzsche, Morgan Hill, CA (US); James Michael Jula, Portland, OR (US); Timothy Alton, Gilroy, CA (US); Russell Elliott Poffenberger, Discovery Bay, CA (US); Michael E. Amy, Danville, CA (US)

(73) Assignee: Xcerra Corporation, Norwood, MA (US)

( * ) Notice: Subject to any disclaimer, the term of this patent is extended or adjusted under 35 U.S.C. 154(b) by 215 days.

(21) Appl. No.: 13/749,199

(22) Filed: Jan. 24, 2013

(65) Prior Publication Data
US 2014/0208160 A1    Jul. 24, 2014

(51) Int. Cl.
*G06F 11/273*    (2006.01)
*G06F 11/22*    (2006.01)

(52) U.S. Cl.
CPC ......... *G06F 11/273* (2013.01); *G06F 11/2294* (2013.01); *G06F 11/2733* (2013.01)

(58) Field of Classification Search
CPC ............. G06F 11/273; G06F 11/2733; G06F 11/2294
USPC ................................... 714/27, 30, 38.14, 40
See application file for complete search history.

(56) References Cited

U.S. PATENT DOCUMENTS

| | | | |
|---|---|---|---|
| 4,397,021 A | 8/1983 | Lloyd et al. | |
| 6,078,970 A | 6/2000 | Nordstrom et al. | |
| 6,085,278 A | 7/2000 | Gates et al. | |
| 6,107,818 A * | 8/2000 | Czamara | G01R 31/31907 324/73.1 |
| 6,615,374 B1 | 9/2003 | Moran | |
| 6,966,019 B2 | 11/2005 | Vlens et al. | |
| 6,985,977 B2 * | 1/2006 | Vrancic | 710/59 |
| 7,024,613 B2 * | 4/2006 | Carnevale et al. | 714/763 |
| 7,027,808 B2 | 4/2006 | Wesby | |
| 7,133,943 B2 * | 11/2006 | Carnevale et al. | 710/52 |
| 7,225,364 B2 * | 5/2007 | Carnevale et al. | 714/43 |
| 7,251,690 B2 | 7/2007 | Williams | |
| 7,266,083 B2 * | 9/2007 | Carnevale et al. | 370/242 |
| 4,975,836 A1 | 3/2008 | Kumaki | |
| 7,340,364 B1 | 3/2008 | Kumaki | |
| 7,389,496 B2 | 6/2008 | Echart et al. | |
| 7,484,016 B2 * | 1/2009 | Shah et al. | 710/22 |

(Continued)

OTHER PUBLICATIONS

Microsoft Corporation, Microsoft Computer Dictionary, 2002, Microsoft Press, Fifth Edition, p. 48.*

(Continued)

*Primary Examiner* — Albert Decady
*Assistant Examiner* — Paul Contino
(74) *Attorney, Agent, or Firm* — Brian J. Colandreo; Michael T. Abramson; Holland & Knight LLP

(57) ABSTRACT

A segmented subsystem, for use within an automated test platform, includes a first subsystem segment including a first data sequencer configured to coordinate the execution of one or more instructions within the first subsystem segment. A second subsystem segment includes a second data sequencer configured to coordinate the execution of one or more instructions within the second subsystem segment.

15 Claims, 5 Drawing Sheets

(56) References Cited

U.S. PATENT DOCUMENTS

| | | | |
|---|---|---|---|
| 7,502,708 | B2 | 3/2009 | Kumaki |
| 7,548,828 | B2 | 6/2009 | Gil et al. |
| 7,627,697 | B2 | 12/2009 | Saito |
| 7,676,713 | B2 | 3/2010 | Holmqvist |
| 7,908,052 | B2 | 3/2011 | Howlett |
| 7,908,531 | B2* | 3/2011 | Fairbanks ............ G06F 11/2294 714/724 |
| 8,001,542 | B2 | 8/2011 | Edwards et al. |
| 8,006,241 | B2 | 8/2011 | Dias |
| 8,032,669 | B2* | 10/2011 | Puri et al. ........................ 710/22 |
| 8,166,341 | B2 | 4/2012 | DeHaan et al. |
| 8,407,528 | B2* | 3/2013 | Larson ................ G06F 11/3476 714/45 |
| 8,434,068 | B2 | 4/2013 | Wrighton et al. |
| 8,718,967 | B2 | 5/2014 | Fuller et al. |
| 8,775,113 | B2 | 7/2014 | Powers et al. |
| 8,788,882 | B2* | 7/2014 | Schroeder ............ G06F 11/263 714/32 |
| 8,832,622 | B1 | 9/2014 | Xu et al. |
| 8,874,953 | B2 | 10/2014 | Tseng et al. |
| 2002/0188853 | A1 | 12/2002 | Owhadi |
| 2003/0221042 | A1 | 11/2003 | Watkins |
| 2005/0132354 | A1 | 6/2005 | Edwards et al. |
| 2005/0149341 | A1 | 7/2005 | Eguchi et al. |
| 2005/0188140 | A1 | 8/2005 | Hitchcock et al. |
| 2005/0222933 | A1 | 10/2005 | Wesby |
| 2006/0075001 | A1 | 4/2006 | Canning et al. |
| 2006/0259656 | A1 | 11/2006 | Sullivan |
| 2007/0101215 | A1 | 5/2007 | Holmqvist |
| 2008/0005258 | A1 | 1/2008 | Sridharan et al. |
| 2008/0320466 | A1 | 12/2008 | Dias |
| 2010/0107146 | A1 | 4/2010 | Wrighton |
| 2010/0131692 | A1 | 5/2010 | Nishizawa et al. |
| 2010/0238037 | A1 | 9/2010 | Bristow et al. |
| 2011/0029709 | A1* | 2/2011 | Feiereisel ............ G06F 13/385 710/305 |
| 2011/0040920 | A1* | 2/2011 | Chou et al. .................... 710/316 |
| 2011/0041105 | A1* | 2/2011 | Chou et al. .................... 716/106 |
| 2011/0055636 | A1 | 3/2011 | DeHaan et al. |
| 2012/0191402 | A1 | 7/2012 | Filler et al. |
| 2012/0311597 | A1 | 12/2012 | Manula et al. |
| 2013/0042155 | A1 | 2/2013 | Millet et al. |
| 2013/0111505 | A1* | 5/2013 | Frick ................ G06F 11/263 719/328 |
| 2013/0219355 | A1* | 8/2013 | Brown ...................... G06F 8/34 717/106 |
| 2013/0339803 | A1* | 12/2013 | Vandervalk ......... G06F 11/2733 714/45 |
| 2014/0137082 | A1* | 5/2014 | Ellis .................... G06F 11/3688 717/124 |
| 2014/0143600 | A1* | 5/2014 | Hutner ................ G06F 11/362 714/35 |
| 2014/0173147 | A1 | 6/2014 | Grafton et al. |
| 2014/0207404 | A1 | 7/2014 | Fritzsche et al. |
| 2014/0208082 | A1 | 7/2014 | Fritzsche et al. |
| 2014/0208161 | A1 | 7/2014 | Fritzsche et al. |
| 2014/0208164 | A1 | 7/2014 | Fritzsche et al. |

OTHER PUBLICATIONS

DSS Networks, Inc., GIGPCI-Express Switch Model 6468, 2005, DSS Networks, Inc.*

PLX Technology, Express Apps, 2005, PLX Technology, Issue No. 10.*

Non-Final Office Action issued in related U.S. Appl. No. 13/749,641 on Dec. 19, 2014.

Non-Final Office Action issued in related U.S. Appl. No. 13/749,260 on Oct. 16, 2015.

Non-Final Office Action issued in related U.S. Appl. No. 13/749,308 on Oct. 19, 2015.

Non-Final Office Action issued in related U.S. Appl. No. 13/749,332 on Oct. 27, 2015.

Final Office Action issued in related U.S. Appl. No. 13/749,260 on Mar. 2, 2016.

Final Office Action issued in related U.S. Appl. No. 13/749,308 on Mar. 1, 2016.

Final Office Action issued in related U.S. Appl. No. 13/749,641 on Apr. 15, 2015.

Non-Final Office Action issued in related U.S. Appl. No. 13/749,260 on Jan. 5, 2015.

Final Office Action issued in related U.S. Appl. No. 13/749,260 on Apr. 15, 2015.

Non-Final Office Action issued in related U.S. Appl. No. 13/749,308 on Dec. 4, 2014.

Final Office Action issued in related U.S. Appl. No. 13/749,308 on Apr. 15, 2015.

Non-Final Office Action issued in related U.S. Appl. No. 13/749,332 on Jul. 23, 2015.

Notice of Allowance issued in related U.S. Appl. No. 13/749,641 on Aug. 11, 2015.

Notice of Allowance issued in related U.S. Appl. No. 13/749,308 on May 24, 2016.

Notice of Allowance issued in related U.S. Appl. No. 13/749,260 on May 19, 2016.

* cited by examiner

AUTOMATED TEST PLATFORM UTILIZING SEGMENTED DATA SEQUENCERS TO PROVIDE TIME CONTROLLED TEST SEQUENCES TO DEVICE UNDER TEST

TECHNICAL FIELD

This disclosure relates to automated test equipment and, more particularly, to segmented automated test equipment.

BACKGROUND

Automated test equipment systems may be used to test various electronic components, which are often referred to as devices under test. Such systems may automate the testing of such components, wherein a component may be subjected to a battery of different tests in some form of logical fashion. Additionally, such systems may provide further levels of automation, wherein the components being tested are automatically swapped out (upon completion of a testing procedure) and replaced with a component that is yet to be tested. Unfortunately, such automated test equipment systems are often rigid in nature and proprietary in their design, resulting in systems that are not easily adaptable/scalable.

SUMMARY OF DISCLOSURE

In one implementation, a segmented subsystem, for use within an automated test platform, includes a first subsystem segment including a first data sequencer configured to coordinate the execution of one or more instructions within the first subsystem segment. A second subsystem segment includes a second data sequencer configured to coordinate the execution of one or more instructions within the second subsystem segment.

One or more of the following features may be included. The first subsystem segment may include a first DMA engine configured to allow the first subsystem segment to read data from and/or write data to a remote memory system. The remote memory system may be accessible by one or more CPU subsystems included within the automated test platform.

The second subsystem segment may include a second DMA engine configured to allow the second subsystem segment to read data from and/or write data to a remote memory system. The remote memory system may be accessible by the one or more CPU subsystems included within the automated test platform.

At least a third subsystem segment may include at least a third data sequencer configured to coordinate the execution of one or more instructions within the at least a third subsystem segment. The at least a third subsystem segment may include at least a third DMA engine configured to allow the at least a third subsystem segment to read data from and/or write data to a remote memory system. The remote memory system may be accessible by one or more CPU subsystems included within the automated test platform.

The segmented subsystem may be a segmented instrument subsystem. The segmented instrument subsystem may include instrument hardware configured to interface with one or more devices under test. The segmented subsystem may be a segmented digital signal processing subsystem.

The segmented subsystem may include a PCIe interface configured to couple the segmented subsystem with a PCIe-based event fabric. The PCIe-based event fabric may include a PCIe backplane. The PCIe-based event fabric may include one or more PCIe switches.

In another implementation, a segmented subsystem, for use within an automated test platform, includes a first subsystem segment including a first data sequencer configured to coordinate the execution of one or more instructions within the first subsystem segment, and a first DMA engine configured to allow the first subsystem segment to read data from and/or write data to a remote memory system. A second subsystem segment includes a second data sequencer configured to coordinate the execution of one or more instructions within the second subsystem segment, and a second DMA engine configured to allow the second subsystem segment to read data from and/or write data to the remote memory system.

One or more of the following features may be included. The remote memory system may be accessible by one or more CPU subsystems included within the automated test platform. At least a third subsystem segment may include at least a third data sequencer configured to coordinate the execution of one or more instructions within the at least a third subsystem segment, and at least a third DMA engine configured to allow the at least a third subsystem segment to read data from and/or write data to a remote memory system.

In another implementation, a segmented instrument subsystem, for use within an automated test platform, includes a first subsystem segment including a first data sequencer configured to coordinate the execution of one or more instructions within the first subsystem segment. A second subsystem segment includes a second data sequencer configured to coordinate the execution of one or more instructions within the second subsystem segment. Instrument hardware is configured to interface with one or more devices under test. A PCIe interface is configured to couple the segmented instrument subsystem with a PCIe-based event fabric.

One or more of the following features may be included. The first subsystem segment may include a first DMA engine configured to allow the first subsystem segment to read data from and/or write data to a remote memory system. The second subsystem segment may include a second DMA engine configured to allow the second subsystem segment to read data from and/or write data to a remote memory system.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
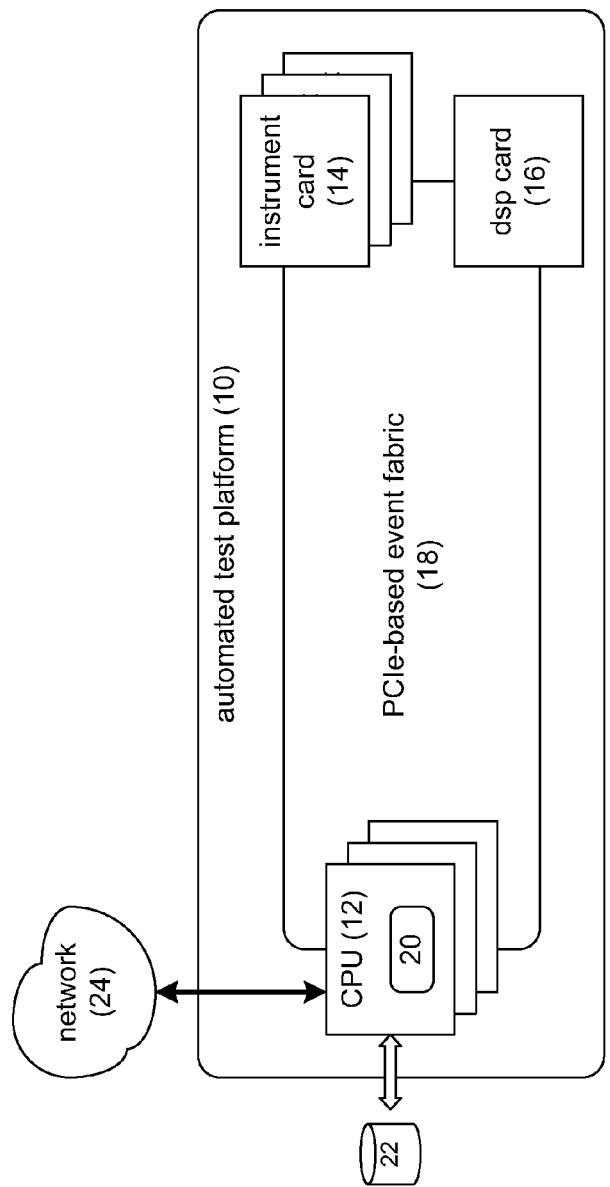
FIG. 1 is a diagrammatic view of an automated test platform.

System Overview:

Referring to FIG. 1, there is shown automated test platform 10. Examples of automated test platform 10 may include, but are not limited to, systems that automate the verification and validation of devices under test (DUTs). As discussed above, automated test equipment systems (e.g. automated test platform 10) may be used to test various electronic components in an automated fashion. Typically, the devices under test are subjected to a battery of different tests, wherein the testing procedures are automated in a logical fashion. For example, during the testing of a power supply, the power supply may be subjected to varying voltage levels and varying voltage frequencies. Further, during the testing of a noise canceling circuit, such a circuit may be subjected to varying levels and frequencies of noise to confirm the satisfactory performance of the same.

Automated test platform 10 may include one or more central processing units (e.g. CPU subsystem 12), one or more instrument subsystems (e.g. instrument card 14), and one or more digital signal processing subsystems (e.g. DSP card 16), all of which may be coupled together via a PCIe-based event fabric 18.

Examples of CPU subsystem 12 may include but are not limited to a personal computer, a server computer, a series of server computers, a mini computer or a single-board computer. CPU subsystem 12 may execute one or more operating systems, examples of which may include but are not limited to: Microsoft Windows XP Server™; Novell Netware™; Redhat Linux™, Unix, or a custom operating system, for example. While in this particular example, automated test platform 10 is shown to include three CPU subsystems, this is for illustrative purposes only and is not intended to be a limitation of this disclosure, as other configurations are possible. For example, the number of CPU subsystems utilized within automated test platform 10 may be increased or decreased depending upon the anticipated loading of automated test platform 10.

CPU subsystem 12 may execute one or more automated test programs (e.g. automated test process 20), wherein automated test process 20 may be configured to automate the testing of various devices under test. Through the use of automated test process 20, an administrator (not shown) of automated test platform 10 may define and execute testing procedures/routines for the various devices under test.

The instruction sets and subroutines of automated test process 20, which may be stored on storage device 22 included within CPU subsystem 12, may be executed by one or more processors (not shown) and one or more memory architectures (not shown) included within CPU subsystem 12. Storage device 22 may include but is not limited to: a hard disk drive; a tape drive; an optical drive; a RAID device; a random access memory (RAM); a read-only memory (ROM); and all forms of flash memory storage devices.

CPU subsystem 12 may be connected to one or more networks (e.g., network 24), examples of which may include but are not limited to: a local area network, a wide area network, an intranet or the internet, for example. Accordingly, CPU subsystem 12 may be administered and/or controlled via network 24. Accordingly, an administrator (not shown) may use a remote computer (not shown) coupled to network 24 to define and/or administer various testing procedures and/or routines via automated test process 20. Additionally and as we discussed below in greater detail, CPU subsystem 12 may use network 24 to obtain updated versions of drivers and/or firmware to maintain current automated test platform 10.

Figure 2:
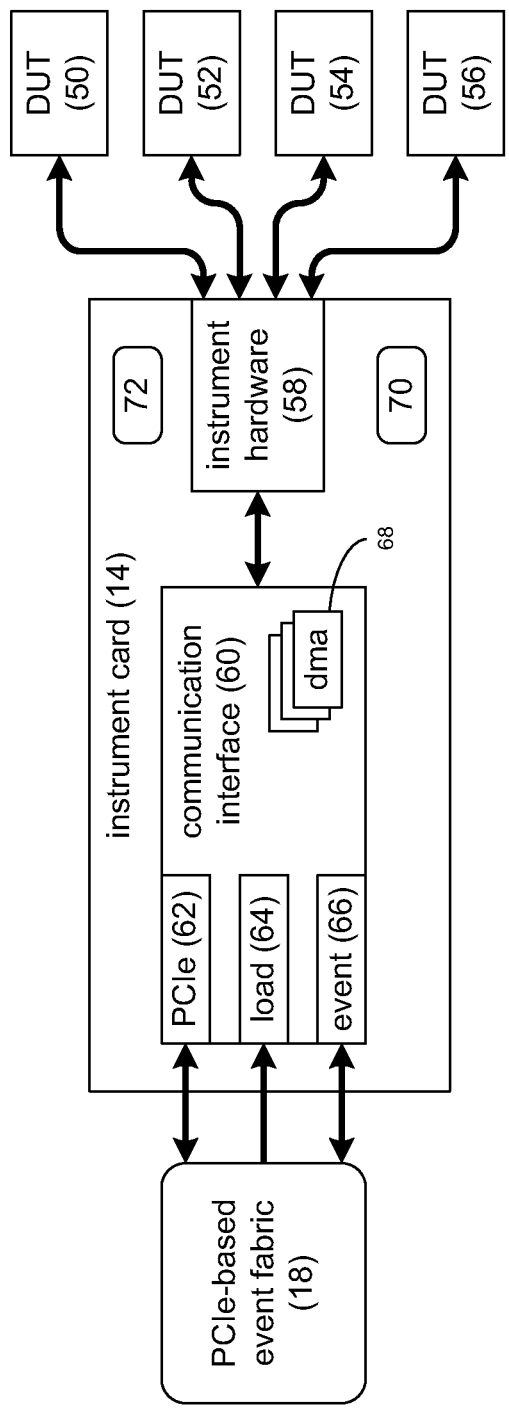
FIG. 2 is a diagrammatic view of an instrument card included within the automated test platform of FIG. 1.

Referring also to FIG. 2, there is shown a more detailed view of instrument card 14. While in this particular example, this detailed view concerns instrument card 14, this is for illustrative purposes only and is not intended to be a limitation of this disclosure, as FIG. 2 is intended to represent a generic description of an instrument card.

As discussed above, automated test platform 10 may be used to test various devices under test. For example, assume for illustrative purposes that instrument card 14 is being used to test devices under test 50, 52, 54, 56. Instrument card 14 may include instrument hardware 58. Specifically, different instrument cards may be designed to perform different functions. For example, certain instrument cards may provide varying levels of voltage, other instrument cards may provide sweeping noise signals, wherein other instrument cards may provide digital clock signals. Accordingly, depending upon the type of functionality that a specific instrument card is designed to perform, the instrument hardware (e.g. instrument hardware 58) included within the specific instrument card may vary.

Further, the manner in which instrument hardware 58 is coupled to (in this example) devices under test 50, 52, 54, 56 may vary depending upon the functionality of instrument card 14. For example, if instrument card 14 is designed to read a particular data register within a device under test, a parallel or serial data cable may be used to couple instrument hardware 58 with the device under test. In the event that instrument card 14 is being used to monitor e.g. voltage levels at a particular terminal within a device under test, a voltage probe may be used to couple instrument hardware 58 to the device under test.

Instrument card 14 may include communication interface system 60. Communication interface system 60 may be configured to couple instrument hardware 58 (and instrument card 14 generally) to PCIe-based event fabric 18. Communication interface system 60 may include various components that allow for the communication of instrument card 14 via PCIe-based event fabric 18.

For example, communication interface system 60 may include PCIe interface 62, which may allow for instrument card 14 to communicate via PCIe-based event fabric 18 using the PCIe communication standards. As is known in the art, PCIe (Peripheral Component Interconnect Express) is a high-speed serial computer expansion bus standard designed to replace the older bus systems (e.g., PCI, PCI-X, and AGP). Through the use of PCIe, higher maximum system bus throughput may be achieved. Other benefit may include lower I/O pin count, a smaller physical footprint, better performance-scaling for bus devices, a more detailed error detection and reporting mechanism, and native plug-n-play functionality.

Communication interface system 60 may further include loader interface 64 (for updating the various components (e.g., firmware) of instrument card 14) and event interface 66 (for orchestrating testing procedures; to be discussed alone greater detail). Additionally and as we discussed below in greater detail, communication interface system 60 may include one or more direct memory access (DMA) engines (e.g. DMA engine 68) that may be configured to allow instrument card 14 to read data from and/or write data to remote memory systems (such as memory systems utilized by e.g. CPU subsystem 12 or other subsystems). PCIe interface 62, loader interface 64 and/or event interface 66 may be configured to communicate with PCIe-based event fabric 18.

Figure 3:
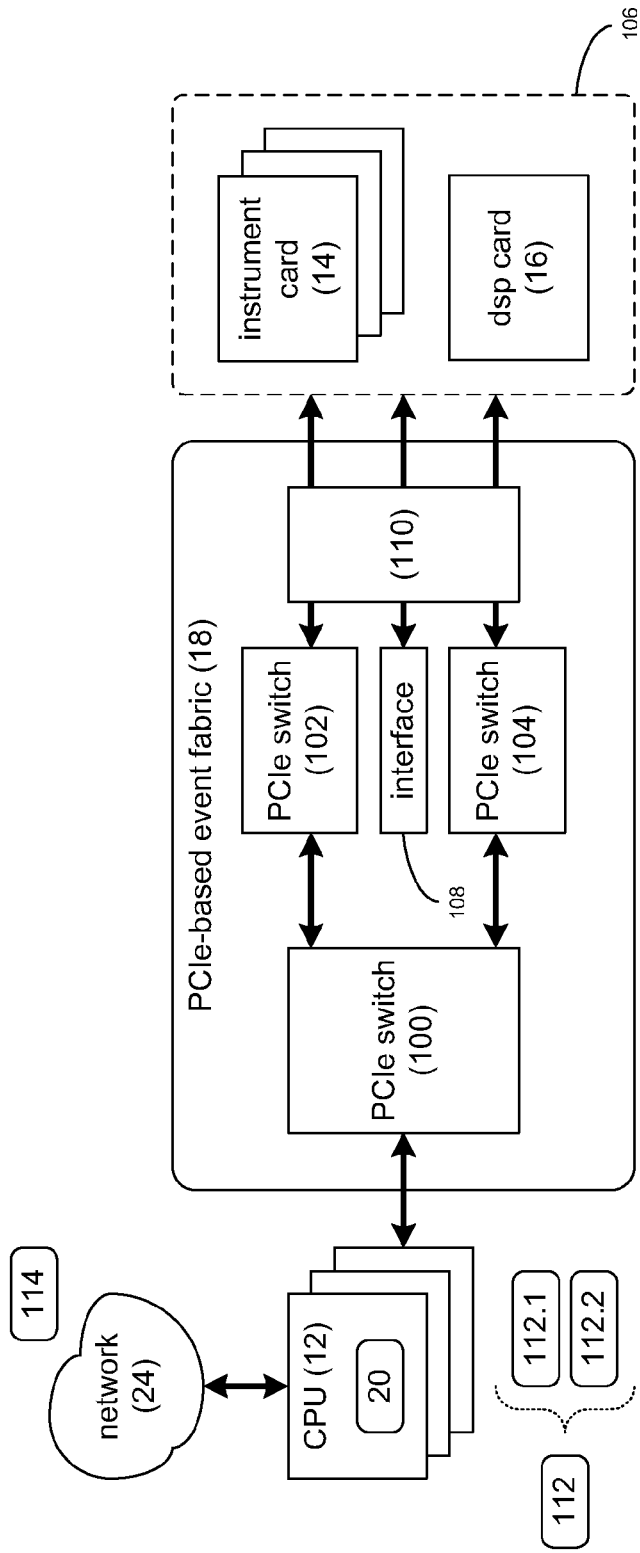
FIG. 3 is a diagrammatic view of a PCIe-based event fabric included within the automated test platform of FIG. 1.

Referring also to FIG. 3, there is shown a more detailed view of PCIe-based event fabric 18. PCIe-based event fabric 18 may include one or more PCIe switches (e.g. PCIe switches 100, 102, 104) that may be configured to interface e.g. CPU subsystem 12 with instrument card 14/DSP card 16. Examples of PCIe switches 100, 102, 104 may include but are not limited to switches available from PLX Technology (e.g., PEX8664, PEX8764, PEX8696 and PEX8796) and switches available from IDT (e.g., 89H64H16G2, 89H64H16G3, 89H48H12G2 and 89H48H12G3). For example, a first PCIe switch (e.g. PCIe switch 100) may be coupled to CPU subsystem 12. PCIe switch 100 may be coupled to PCIe switches 102, 104, which may be coupled to the expansion cards 106 included within automated test platform 10. Examples of expansion cards 106 may include but are not limited to instrument card 14 and DSP card 16.

Additionally, PCIe-based event fabric 18 may include interface 108 for communicating with loader interface 64 and event interface 66. Further, PCIe-based event fabric 18 may include PCIe backplane 110, which may include a plurality of slots (not shown) for electrically coupling devices to PCIe backplane 110 via card edge type connections. Further, PCIe backplane 110 may include a plurality of socket type connectors (not shown) for electrically coupling devices to PCIe backplane 110 via cable type connections.

Since PCIe-based event fabric 18 uses the PCIe communication standards, enhanced levels of data throughput may be realized by automated test platform 10. Specifically and as is known in the art, within a PCIe-based system (such as automated test platform 10), data may be transferred via paired point-to-point serial links (called communication lanes), thus allowing for data to be simultaneously transferred in both directions between PCI-e devices. Additionally, such a configuration may also allow for multiple devices within the PCIe-based system to simultaneously communicate with each other. Further, PCIe slots/connectors may contain 1-32 communication lanes (based upon powers of two). Accordingly, a specific PCIe-based slot/connector may be assigned 1, 2, 4, 8, 16 or 32 lanes, thus allowing the designer to adjust the bandwidth provided to a specific slot/connector by varying the number of communication lanes assigned to the same.

Figure 4:
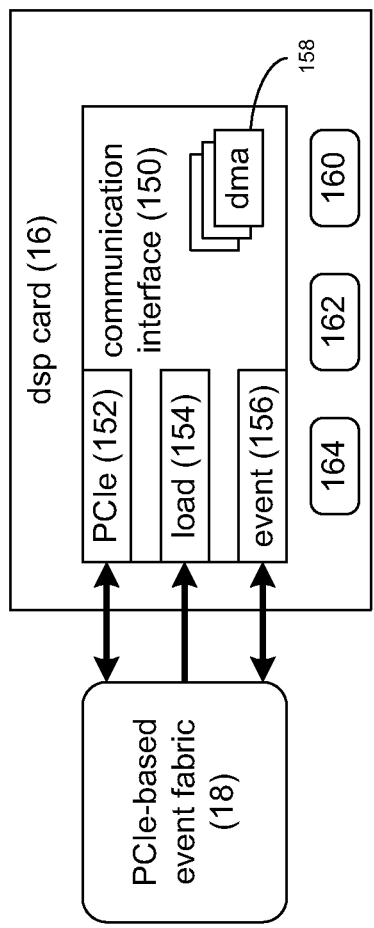
FIG. 4 is a diagrammatic view of a DSP card included within the automated test platform of FIG. 1.

Referring also to FIG. 4, there is shown a more detailed view of DSP card 16. DSP card 16 may include communication interface system 150. Communication interface system 150 may be configured to couple DSP card 16 to PCIe-based event fabric 18. Communication interface system 150 may include various components that allow for the communication of DSP card 16 via PCIe-based event fabric 18.

For example, communication interface system 150 may include PCIe interface 152, which may allow for DSP card 16 to communicate via PCIe-based event fabric 18 using the PCIe communication standards. Communication interface system 60 may further include loader interface 154 (for updating the various components (e.g., firmware) of DSP card 16) and event interface 156 (for orchestrating testing procedures; to be discussed alone greater detail). Additionally and as will be discussed below in greater detail, communication interface system 150 may include one or more direct memory access (DMA) engines (e.g. DMA engine 158) that may be configured to allow DSP card 16 to read data from and/or write data to remote memory systems (such as memory systems utilized by e.g. CPU subsystem 12 or other subsystems). PCIe interface 152, loader interface 154 and/or event interface 156 may be configured to communicate with PCIe-based event fabric 18.

General Operation:

As discussed above, automated test platform 10 may be used to test various electronic components. CPU subsystem 12 may execute one or more automated test programs (e.g. automated test process 20), wherein automated test process 20 may be configured to automate the testing of e.g., devices under test 50, 52, 54, 56. Through the use of automated test process 20, an administrator (not shown) of automated test platform 10 may define testing procedures/routines for devices under test 50, 52, 54, 56. Once automated test process 20 defines these testing procedures/routines, testing instructions (e.g., instructions 112) may be defined and stored locally on a memory system (not shown) accessible by CPU subsystem 12.

Instructions 112 may instruct the subsystems (e.g. instrument card 14/DSP card 16) to perform various operations. For example, instrument card 14 may obtain instructions 112 via e.g., DMA engine 68. As discussed above, DMA engine 68 may be configured to allow instrument card 14 to read data from and/or write data to remote memory systems (such as memory systems utilized by e.g. CPU subsystem 12 or other instrument cards). Accordingly, CPU subsystem 12 may notify the various subsystems (e.g., instrument card 14/DSP card 16) that instructions 112 are available and e.g., instrument card 14 may obtain instructions 112 from the memory system accessible by CPU subsystem 12 via DMA engine 68.

Once instructions 112 are obtained by (in this example) instrument card 14, the testing procedure may begin. For example, instrument card 14 may provide one or more variable input signals to device under test 50 while monitoring one or more output signals provided by device under test 50. The output signals provided by device under test 50 (e.g., captured test data 70) may be stored within a memory subsystem (not shown) included within instrument card 14. Depending upon the manner in which automated test process 20 is configured by the administrator (not shown) of automated test platform 10, these testing procedures may be repeated (to produce multiple identical test runs) or varied (to produce differing test runs). These various testing procedures may be sequenced by automated test process 20 via the event interface (e.g., event interfaces 66, 156). Specifically, automated test process 20 may provide timing and/or sequencing signals to the various components of automated test platform 10 through event interfaces 66, 156 in conjunction with interface 108 included within PCIe-based event fabric 18.

Once the automated test process 20 has been executed and the collection of captured test data 70 is complete, instrument card 14 may provide captured test data 70 to CPU subsystem 12 for processing. Instrument card 14 may accomplish this transfer of captured test data 70 to CPU subsystem 12 via DMA engine 68 by writing captured test data 70 directly to the memory system (not shown) accessible by CPU subsystem 12.

In the event that captured test data 70 is of considerable size (or the loading of CPU subsystem 12 is concerning), instrument card 14 may provide captured test data 70 to DSP card 16 for processing. Instrument card 14 may accomplish this transfer of captured test data 70 to DSP card 16 via DMA engine 68 by writing captured test data 70 directly to a memory system (not shown) accessible by DSP card 16. Alternatively, DSP card 16 may obtain captured test data 70 via DMA engine 158 by reading captured test data 70 directly from the memory system (not shown) accessible by instrument card 14.

DSP card 16 may then process captured test data 70 to generate result set 160 which may be stored within the memory subsystem (not shown) accessible by DSP card 16. Once this processing is complete, DSP card 16 may provide result set 160 to CPU subsystem 12. DSP card 16 may accomplish this transfer of result set 160 to CPU subsystem 12 via DMA engine 158 by writing result set 160 directly to the memory system (not shown) accessible by CPU subsystem 12.

Segmentation

As discussed above, automated test platform 10 may include one or more instrument subsystems (e.g. instrument card 14) and one or more digital signal processing subsystems (e.g. DSP card 16). Further and as discussed above, each of these (instrument and digital signal processing) subsystems may include multiple DMA engines (e.g., DMA engine 68 within instrument card 14 and DMA engine 158 within DSP card 16) that may be configured to allow these subsystems to read data from and/or write data to remote memory systems, such as memory systems utilized by e.g. CPU subsystem 12 (or other subsystems) within automated test platform.

Figure 5:
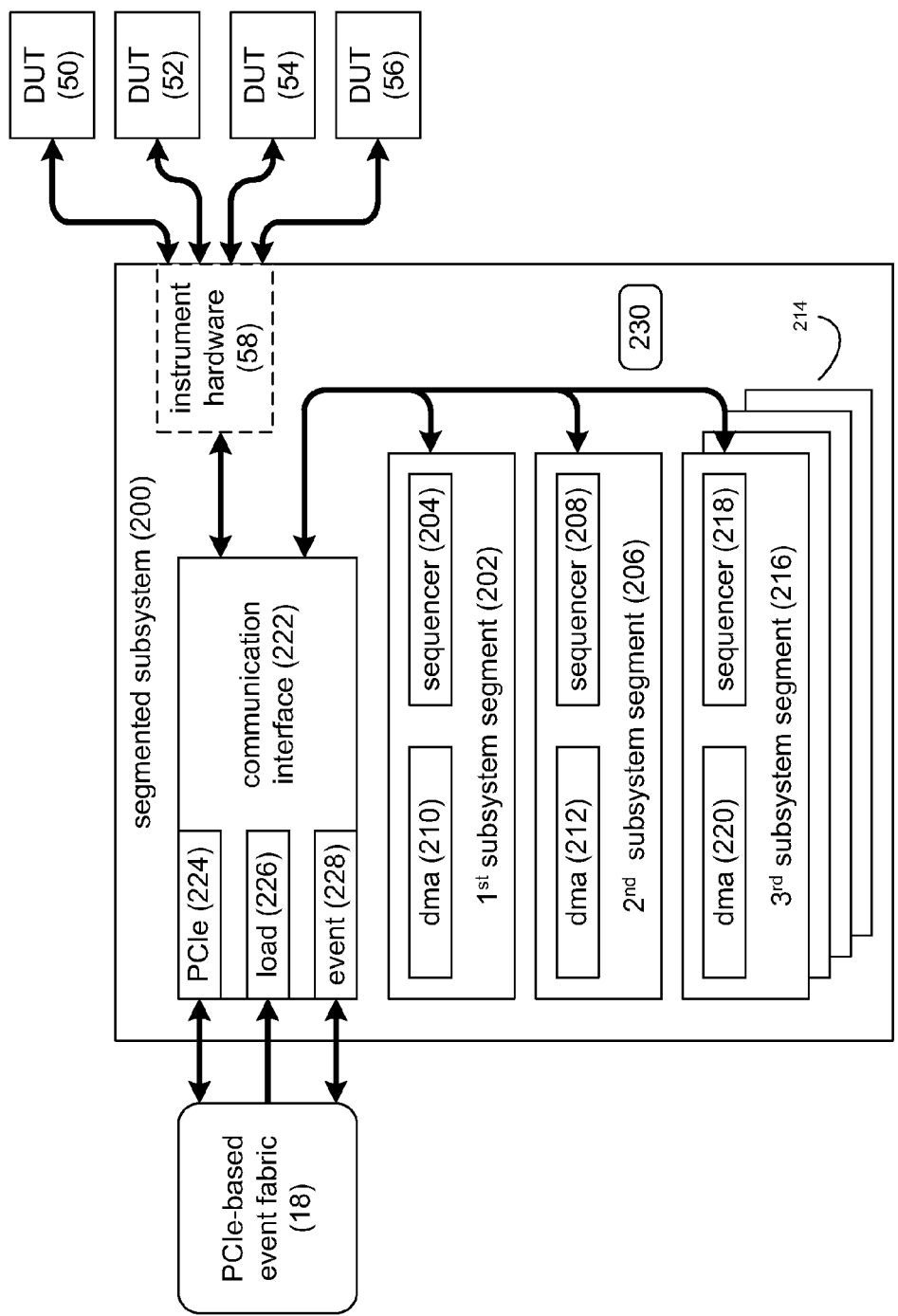
FIG. 5 is a diagrammatic view of a segmented subsystem included within the automated test platform of FIG. 1.

Referring also to FIG. 5, there is shown a detail view of segmented subsystem 200 (for use within automated test platform 10). Segmented subsystem 200 may be a segmented instrument subsystem (e.g., a segmented version of instrument card 14) or a segmented digital signal processing subsystem (e.g., a segmented version of DSP card 16). If segmented subsystem 200 is configured as a segmented instrument subsystem, segmented subsystem 200 may include instrument hardware 58 (shown in phantom) configured to interface with one or more devices under test (e.g., devices under test 50, 52, 54, 56).

Segmented subsystem 200 may include first subsystem segment 202. First subsystem segment 202 may include first data sequencer 204, which may be configured to coordinate the execution of one or more instructions within first subsystem segment 202.

Segmented subsystem 200 may further include second subsystem segment 206. Second subsystem segment 206 may include second data sequencer 208, which may be configured to coordinate the execution of one or more instructions within second subsystem segment 206.

First subsystem segment 202 may further include first DMA engine 210 configured to allow first subsystem segment 202 to read data from and/or write data to a remote memory system, such as a remote memory system accessible by CPU subsystem 12 (or any other subsystem) included within automated test platform 10.

Second subsystem segment 206 may include second DMA engine 212 configured to allow second subsystem segment 206 to read data from and/or write data to a remote memory system, such as a remote memory system accessible by CPU subsystem 12 (or any other subsystem) included within automated test platform 10.

While segmented subsystem 200 is described above as including two subsystem segments (namely subsystem segments 202, 206), this is for illustrative purposes only and is not intended to be a limitation of this disclosure. For example, segmented subsystem 200 may include one or more additional subsystem segments 214 (e.g., third subsystem segment 216), each of which may include a data sequencer (e.g., third data sequencer 218) configured to coordinate the execution of one or more instructions within third subsystem segment 216. Each of the additional subsystem segments 214 (e.g., third subsystem segment 216) may include a DMA engine (e.g., third DMA engine 220) configured to allow third subsystem segment 216 to read data from and/or write data to a remote memory system, such as a remote memory system accessible by CPU subsystem 12 (or any other subsystem) included within automated test platform 10.

Segmented subsystem 200 may include communication interface system 222, which may be configured to couple segmented subsystem 200 to PCIe-based event fabric 18. Communication interface system 222 may include various components that allow for the communication of segmented subsystem 200 via PCIe-based event fabric 18.

For example, communication interface system 222 may include PCIe interface 224, which may allow for segmented subsystem 200 to communicate via PCIe-based event fabric 18 using the PCIe communication standards. Communication interface system 222 may further include loader interface 226 (for updating the various components (e.g., firmware) of segmented subsystem 200) and event interface 228 (for orchestrating testing procedures; to be discussed alone greater detail).

Segmented Operation:

As discussed above, automated test platform 10 may be used to test various electronic components, wherein CPU subsystem 12 may execute one or more automated test programs (e.g. automated test process 20) to define testing procedures/routines for devices under test 50, 52, 54, 56. Once automated test process 20 defines these testing procedures/routines, testing instructions (e.g., instructions 112) may be defined and stored locally on a memory system (not shown) accessible by CPU subsystem 12.

Instructions 112 may instruct segmented subsystem 200 to perform various operations. For example, assume that instructions 112 includes two subsets of instructions (e.g., instructions 112.1 and instructions 112.2), wherein instructions 112.1 are to be performed by first subsystem segment 202 and instructions 112.2 are to be performed by second subsystem segment 206.

Accordingly, segmented subsystem 200 may obtain instructions 112.1 via e.g., DMA engine 210. As discussed above, DMA engine 210 may be configured to allow first subsystem segment 202 to read data from and/or write data to remote memory systems (such as memory systems utilized by e.g. CPU subsystem 12 or other instrument cards). Further, segmented subsystem 200 may obtain instructions 112.2 via e.g., DMA engine 212. As discussed above, DMA engine 212 may be configured to allow second subsystem segment 206 to read data from and/or write data to remote memory systems (such as memory systems utilized by e.g. CPU subsystem 12 or other instrument cards).

Accordingly, CPU subsystem 12 may notify the various subsystems (e.g., segmented subsystem 200) that instructions 112 (which include instructions 112.1, 112.2) are available and e.g., first subsystem segment 202 of segmented subsystem 200 may obtain instructions 112.1 from the memory system accessible by CPU subsystem 12 via DMA engine 210. Further, second subsystem segment 206 of segmented subsystem 200 may obtain instructions 112.2 from the memory system accessible by CPU subsystem 12 via DMA engine 212.

Once instructions 112.1, 112.2 are obtained by (in this example) segmented subsystem 200, the testing procedure may begin. For example, first subsystem segment 202 of segmented subsystem 200 may provide one or more variable input signals to device under test 50 while second subsystem segment 206 of segmented subsystem 200 may monitor one or more output signals provided by device under test 50. The output signals provided by device under test 50 (e.g., captured test data 230) may be stored within a memory subsystem (not shown) included within segmented subsystem 200. Depending upon the manner in which automated test process 20 is configured by the administrator (not shown) of automated test platform 10, these testing procedures may be repeated (to produce multiple identical test runs) or varied (to produce differing test runs).

These various testing procedures may be sequenced by automated test process 20 via the combination of event interface 228 and sequencers 204, 208. Specifically, automated test process 20 may provide timing and/or sequencing signals to the various components of (in this example) segmented subsystem 200 through event interface 228 (via interface 108 included within PCIe-based event fabric 18), which may be routed to sequencer 204 (for timing and/or sequencing signals concerning first subsystem segment 202) and sequencer 208 (for timing and/or sequencing signals concerning second subsystem segment 206).

Concerning these timing and/or sequencing signals, first subsystem segment 202 may be instructed to e.g., provide a first frequency input signal to device under test 50 for a first defined period of time, wherein (during this first defined period of time) second subsystem segment 206 is instructed to monitor a first output signal provided on a first output port of device under test 50 (to generate a first portion of captured test data 230). After the expiry of this first defined period of time, first subsystem segment 202 may be instructed to e.g., provide a second frequency input signal to device under test 50 for a second defined period of time, wherein (during this second defined period of time) second subsystem segment 206 is instructed to monitor a second output signal provided on a second output port of device under test 50 (to generate a second portion of captured test data 230).

Once the automated test process 20 has been executed and the collection of captured test data 230 is complete, segmented subsystem 200 may provide captured test data 230 to CPU subsystem 12 for processing. Specifically, second subsystem segment 206 of segmented subsystem 200 (i.e., the subsystem segment that collected captured test data 230) may accomplish this transfer of captured test data 230 to CPU subsystem 12 via DMA engine 212 by writing captured test data 230 directly to the memory system (not shown) accessible by CPU subsystem 12.

In the event that captured test data 230 is of considerable size (or the loading of CPU subsystem 12 is concerning), segmented subsystem 200 may provide captured test data 230 to e.g., DSP card 16 for processing. Second subsystem segment 206 of segmented subsystem 200 (i.e., the subsystem segment that collected captured test data 230) may accomplish this transfer of captured test data 230 to DSP card 16 via DMA engine 212 by writing captured test data 230 directly to a memory system (not shown) accessible by DSP card 16. Alternatively, DSP card 16 may obtain captured test data 230 via DMA engine 158 by reading captured test data 230 directly from the memory system (not shown) accessible by segmented subsystem 200.

DSP card 16 may then process captured test data 230 to generate result set 164 which may be stored within the memory subsystem (not shown) accessible by DSP card 16. Once this processing is complete, DSP card 16 may provide result set 164 to CPU subsystem 12. DSP card 16 may accomplish this transfer of result set 164 to CPU subsystem 12 via DMA engine 158 by writing result set 164 directly to the memory system (not shown) accessible by CPU subsystem 12.

Automated Updates:

Automated test platform 10 generally (and automated test process 20 specifically) may be configured to perform an automated configuration/update/maintenance process to ensure that the various components of automated test platform 10 are up-to-date. For example, upon the occurrence of a computer-related event, automated test process 20 may compare code utilized by one or more subsystems (e.g., code 72 for instrument card 14 and/or code 162 for DSP card 16) included within automated test platform 10 to code (e.g., code 114) available from a remote location (e.g., a remote website located on network 24).

Concerning the above-described computer-related event, examples may include but are not limited to the occurrence of a booting procedure and the occurrence of an update procedure. For example, automated test process 20 may perform maintenance each time that e.g., CPU subsystem 12 is booted. Alternatively/additionally, automated test process 20 may perform maintenance each time that an update procedure is initiated by an administrator (not shown) of automated test platform 10.

Concerning the code (e.g., code 72, 162) utilized by the one or more subsystems and the code (e.g., code 114) available from the remote location (e.g., a remote website located on network 24), examples of such code may include but are not limited to firmware code (e.g., for updating the BIOS of a subsystem) and/or driver code (e.g., for updating the drivers used to access a subsystem).

If the code (e.g., code 114) available from the remote location (e.g., a remote website located on network 24) is newer than the code (e.g., code 72, 162) utilized by the one or more subsystems, automated test process 10 may obtain the code available from the remote location (e.g., a remote website located on network 24), thus defining newer code. Examples of such newer code may include but are not limited to a firmware update and a driver update for one or more of the subsystems of automated test platform 10.

Once obtained, automated test process 20 may update the code utilized by the subsystems (e.g., code 72 for instrument card 14 and/or code 162 for DSP card 16) with the newer code via loader interface 64, 154. For example, automated test process 20 may utilize loader interface 64, 154 to provide (via PCIe-based event fabric 18) the new code to update the firmware and/or the drivers of the various subsystems of automated test platform 10. In a similar fashion, the above-described process may also be utilized to update the code utilized by segmented subsystem 200 using loader interface 226.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A segmented subsystem, for use within an automated test platform, comprising:
 a first subsystem segment including a first data sequencer configured to coordinate the execution of one or more instructions within the first subsystem segment, wherein the first subsystem segment is at least one of a first instrument card and a first digital signal processing card, and wherein the first subsystem segment includes a first DMA engine configured to allow the first subsystem segment to read data from and/or write data to a remote memory system;
 one or more PCIe based event fabrics including one or more PCIe switches, the one or more PCIe switches configured to interface one or more CPU subsystems with at least one of the first instrument card and the first digital signal processing card, wherein at least one of the first instrument card and the first digital signal processing card is separate from each of the one or more PCIe switches; and a second subsystem segment including a second data sequencer configured to coordinate the execution of one or more instructions within the second subsystem segment, wherein the second subsystem segment is at least one of a second instrument card and a second digital signal processing card, wherein the first subsystem segment is further configured to provide one or more variable input signals to a device under test for a first defined period of time based on a timing signal, wherein the second subsystem segment is further configured to monitor one or more output signals provided by the device under test resulting from the one or more variable input signals provided by the first subsystem segment to the device under test during the first defined period of time, wherein after expiration of the first defined period of time, the first subsystem segment is further configured to provide one or more variable input signals to the device under test for a second defined period of time based on a timing signal, and wherein the second subsystem segment is further configured to monitor one or more output signals provided by the device under test resulting from the one or more variable input signals provided by the first subsystem segment to the device under test during the second defined period of time.

2. The segmented subsystem of claim 1 wherein the remote memory system is accessible by the one or more CPU subsystems included within the automated test platform.

3. The segmented subsystem of claim 1 wherein the second subsystem segment includes a second DMA engine configured to allow the second subsystem segment to read data from and/or write data to a remote memory system.

4. The segmented subsystem of claim 3 wherein the remote memory system is accessible by the one or more CPU subsystems included within the automated test platform.

5. The segmented subsystem of claim 1 further comprising at least a third subsystem segment including at least a third data sequencer configured to coordinate the execution of one or more instructions within the at least a third subsystem segment.

6. The segmented subsystem of claim 5 wherein the at least a third subsystem segment includes at least a third DMA engine configured to allow the at least a third subsystem segment to read data from and/or write data to a remote memory system.

7. The segmented subsystem of claim 6 wherein the remote memory system is accessible by the one or more CPU subsystems included within the automated test platform.

8. The segmented subsystem of claim 1 wherein at least one of the first and second subsystem segment is a segmented instrument subsystem.

9. The segmented subsystem of claim 8 wherein the segmented instrument subsystem includes instrument hardware configured to interface with one or more devices under test.

10. The segmented subsystem of claim 1 wherein at least one of the first and second subsystem segment includes a PCIe interface configured to couple the subsystem segment with the one or more PCIe-based event fabrics.

11. The segmented subsystem of claim 10 wherein at least one of the one or more PCIe-based event fabrics include a PCIe backplane.

12. A segmented subsystem, for use within an automated test platform, comprising:
a first subsystem segment, wherein the first subsystem segment is at least one of a first instrument card and a first digital signal processing card, including:
a first data sequencer configured to coordinate the execution of one or more instructions within the first subsystem segment, and a first DMA engine configured to allow the first subsystem segment to read data from and/or write data to a remote memory system;
one or more PCIe based event fabrics including one or more PCIe switches, the one or more PCIe switches configured to interface one or more CPU subsystems with at least one of the first instrument card and the first digital signal processing card, wherein at least one of the first instrument card and the first digital signal processing card is separate from each of the one or more PCIe switches; and
a second subsystem segment, wherein the second subsystem segment is at least one of a second instrument card and a second digital signal processing card, including:
a second data sequencer configured to coordinate the execution of one or more instructions within the second subsystem segment, and a second DMA engine configured to allow the second subsystem segment to read data from and/or write data to the remote memory system, wherein the first subsystem segment is further configured to provide one or more variable input signals to a device under test for a first defined period of time based on a timing signal, wherein the second subsystem segment is further configured to monitor one or more output signals provided by the device under test resulting from the one or more variable input signals provided by the first subsystem segment to the device under test during the first defined period of time, wherein after expiration of the first defined period of time, the first subsystem segment is further configured to provide one or more variable input signals to the device under test for a second defined period of time based on a timing signal, and wherein the second subsystem segment is further configured to monitor one or more output signals provided by the device under test resulting from the one or more variable input signals provided by the first subsystem segment to the device under test during the second defined period of time.

13. The segmented subsystem of claim 12 further comprising at least a third subsystem segment including: at least a third data sequencer configured to coordinate the execution of one or more instructions within the at least a third subsystem segment, and at least a third DMA engine configured to allow the at least a third subsystem segment to read data from and/or write data to a remote memory system.

14. A segmented instrument subsystem, for use within an automated test platform, comprising:
a first subsystem segment including a first data sequencer configured to coordinate the execution of one or more instructions within the first subsystem segment, wherein the first subsystem segment is at least one of a first instrument card and a first digital signal processing card, and wherein the first subsystem segment includes a first DMA engine configured to allow the first subsystem segment to read data from and/or write data to a remote memory system;

a second subsystem segment including a second data sequencer configured to coordinate the execution of one or more instructions within the second subsystem segment, wherein the second subsystem segment is at least one of a second instrument card and a second digital signal processing card;

instrument hardware configured to interface with one or more devices under test, wherein at least one of the first instrument card and the first digital signal processing card includes the instrument hardware; and a PCIe interface configured to couple the segmented instrument subsystem with one or more PCIe-based event fabrics, the one or more PCIe based event fabrics including one or more PCIe switches, the one or more PCIe switches configured to interface one or more CPU subsystems with at least one of the first instrument card and the first digital signal processing card, wherein at least one of the first instrument card and the first digital signal processing card is separate from each of the one or more PCIe switches, wherein the first subsystem segment is further configured to provide one or more variable input signals to a device under test for a first defined period of time based on a timing signal, wherein the second subsystem segment is further configured to monitor one or more output signals provided by the device under test resulting from the one or more variable input signals provided by the first subsystem segment to the device under test during the first defined period of time, wherein after expiration of the first defined period of time, the first subsystem segment is further configured to provide one or more variable input signals to the device under test for a second defined period of time based on a timing signal, and wherein the second subsystem segment is further configured to monitor one or more output signals provided by the device under test resulting from the one or more variable input signals provided by the first subsystem segment to the device under test during the second defined period of time.

15. The segmented instrument subsystem of claim 14 wherein the second subsystem segment includes a second DMA engine configured to allow the second subsystem segment to read data from and/or write data to a remote memory system.

* * * * *